US009540973B2

(12) United States Patent
Ogino et al.

(10) Patent No.: US 9,540,973 B2
(45) Date of Patent: Jan. 10, 2017

(54) OIL PASSAGE STRUCTURE OF DRY SUMP ENGINE AND OIL PASSAGE STRUCTURE OF V-SHAPED DRY SUMP ENGINE

(71) Applicant: HONDA MOTOR CO., LTD., Tokyo (JP)

(72) Inventors: Hirotaka Ogino, Wako (JP); Yukio Konishi, Wako (JP); Takuya Ono, Wako (JP); Takuma Adachi, Wako (JP); Hiroaki Sato, Wako (JP); Hidehiko Kamiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 103 days.

(21) Appl. No.: 14/535,474

(22) Filed: Nov. 7, 2014

(65) Prior Publication Data

US 2015/0128886 A1 May 14, 2015

(30) Foreign Application Priority Data

Nov. 8, 2013 (JP) ................................ 2013-232599

(51) Int. Cl.
*F02B 75/22* (2006.01)
*F01M 11/02* (2006.01)
(Continued)

(52) U.S. Cl.
CPC ................ *F01M 11/02* (2013.01); *F01L 1/02* (2013.01); *F01L 1/053* (2013.01); *F01M 1/02* (2013.01);
(Continued)

(58) Field of Classification Search
CPC ..... F02B 75/22; F02B 61/02; F02B 2075/027; F02B 2075/1808; F02B 2075/025
(Continued)

(56) References Cited

U.S. PATENT DOCUMENTS 5,190,005 A * 3/1993 Saito ........................ F01M 1/02 123/195 H
6,032,635 A * 3/2000 Moorman ................ F01M 1/04 123/196 CP
(Continued)

FOREIGN PATENT DOCUMENTS

CN 102562216 7/2012
JP 05-42616 U 6/1993
(Continued)

OTHER PUBLICATIONS

Japanese Office Action for corresponding JP Application No. 2013-232599, Nov. 10, 2015 (w/ English machine translation).
(Continued)

*Primary Examiner* — Lindsay Low
*Assistant Examiner* — Charles Brauch
(74) *Attorney, Agent, or Firm* — Mori & Ward, LLP

(57) ABSTRACT

An oil passage structure of a dry sump engine includes an oil recovery passage, at least one first communicating hole, and a first oil suction passage. The oil recovery passage extends in a direction in which a cylinder bank extends and is disposed so that at least part of the oil recovery passage is located outward of an external lower end portion of a valve gear chamber of a cylinder head along a junction between a side wall portion of the cylinder head and a bottom surface of the valve gear chamber in a state where the dry sump engine is mounted on a vehicle in an inclined manner. The at least one first communicating hole is provided in the side wall portion so as to connect the valve gear chamber of the cylinder head and the oil recovery passage.

18 Claims, 3 Drawing Sheets

(51) Int. Cl.

| | |
|---|---|
| ***F01M 9/10*** | (2006.01) |
| ***F01M 11/00*** | (2006.01) |
| ***F01M 1/02*** | (2006.01) |
| ***F01L 1/02*** | (2006.01) |
| ***F01L 1/053*** | (2006.01) |
| *F02B 75/02* | (2006.01) |
| *F02B 75/18* | (2006.01) |
| *F02B 61/02* | (2006.01) |

(52) U.S. Cl.
CPC ............ *F01M 9/10* (2013.01); *F01M 11/0004* (2013.01); *F02B 75/22* (2013.01); *F01M 2011/0083* (2013.01); *F02B 61/02* (2013.01); *F02B 2075/025* (2013.01); *F02B 2075/027* (2013.01); *F02B 2075/1808* (2013.01)

(58) Field of Classification Search
USPC ........................................................ 123/54.4
See application file for complete search history.

(56) References Cited

U.S. PATENT DOCUMENTS

| | | | | |
|---|---|---|---|---|
| 7,819,227 B2 | 10/2010 | Rutschmann et al. | | |
| 2002/0029753 A1* | 3/2002 | Hirano | F02B 75/22 | 123/54.4 |
| 2009/0235895 A1* | 9/2009 | Hisatomi | F01M 1/08 | 123/196 R |
| 2011/0244999 A1* | 10/2011 | Nakamura | F16H 9/18 | 474/91 |

FOREIGN PATENT DOCUMENTS

| | | |
|---|---|---|
| JP | 08-246828 | 9/1996 |
| JP | 2004-108282 | 4/2004 |
| JP | 2007-198311 | 8/2007 |
| JP | 4511597 B2 | 2/2008 |

OTHER PUBLICATIONS

Chinese Office Action for corresponding CN Application No. 201410596734.0, Aug. 18, 2016.

* cited by examiner

OIL PASSAGE STRUCTURE OF DRY SUMP ENGINE AND OIL PASSAGE STRUCTURE OF V-SHAPED DRY SUMP ENGINE

CROSS-REFERENCE TO RELATED APPLICATIONS

The present application claims priority under 35 U.S.C. §119 to Japanese Patent Application No. 2013-232599, filed Nov. 8, 2013, entitled "Oil Passage Structure of Dry Sump Engine and Oil Passage Structure of V-type Dry Sump Engine." The contents of this application are incorporated herein by reference in their entirety.

BACKGROUND

1. Field

The present disclosure relates to an oil passage structure of a dry sump engine and an oil passage structure of a V-shaped dry sump engine.

2. Description of the Related Art

Examples of vehicle engines include a dry sump engine that transfers oil inside the engine body to an oil reservoir using a scavenging pump (see Japanese Patent No. 4511597).

SUMMARY

According to one aspect of the present invention, an oil passage structure of a dry sump engine mounted on a vehicle in an inclined manner includes an oil recovery passage, at least one first communicating hole, and a first oil suction passage. The oil recovery passage extends in a direction in which a cylinder bank extends and is disposed so that at least part of the oil recovery passage is located outward of an external lower end portion of a valve gear chamber of a cylinder head along a junction between a side wall portion of the cylinder head and a bottom surface of the valve gear chamber in a state where the dry sump engine is mounted on the vehicle in the inclined manner. The junction is located at a lowermost portion of the cylinder head. The at least one first communicating hole is formed in the side wall portion so as to connect the valve gear chamber of the cylinder head and the oil recovery passage together. The first oil suction passage connects the oil recovery passage and a first oil suction device together. Oil in the valve gear chamber of the cylinder head is sucked by the first oil suction device into an oil reservoir through the at least one first communicating hole, the oil recovery passage, and the first oil suction passage.

According to another aspect of the present invention, an oil passage structure of a V-shaped dry sump engine including left and right cylinder banks extending in front and rear directions of a vehicle includes an oil recovery passage, a plurality of first communicating holes, and a first oil suction passage. The oil recovery passage extends in the front and rear direction of the vehicle and is disposed so that at least part of the oil recovery passage is located outward of an external lower end portion of a valve gear chamber of a cylinder head of each of the left and right banks along a junction between a side wall portion of the cylinder head and a bottom surface of the valve gear chamber in a state where the V-shaped dry sump engine is mounted on the vehicle. The junction is located at a lowermost portion of the cylinder head. The plurality of first communicating holes are formed in the side wall portion so as to connect the valve gear chamber of the cylinder head and the oil recovery passage together. The first oil suction passage connects the oil recovery passage and a first oil suction device together. Oil in the valve gear chamber of the cylinder head is sucked by the first oil suction device into an oil reservoir through the plurality of first communicating holes, the oil recovery passage, and the first oil suction passage.

According to further aspect of the present invention, an oil passage structure of a dry sump engine includes an oil recovery passage, at least one first communicating hole, and a first oil suction passage. The oil recovery passage extends in a direction in which a cylinder bank extends and is disposed so that at least part of the oil recovery passage is located outward of an external lower end portion of a valve gear chamber of a cylinder head along a junction between a side wall portion of the cylinder head and a bottom surface of the valve gear chamber in a state where the dry sump engine is mounted on a vehicle in an inclined manner. The junction is located at a lowermost portion of the cylinder head. The at least one first communicating hole is provided in the side wall portion so as to connect the valve gear chamber of the cylinder head and the oil recovery passage. The first oil suction passage connects the oil recovery passage and a first oil suction device. Oil in the valve gear chamber of the cylinder head is to be sucked by the first oil suction device into an oil reservoir through the at least one first communicating hole, the oil recovery passage, and the first oil suction passage.

According to the other aspect of the present invention, an oil passage structure of a V-shaped dry sump engine including left and right cylinder banks includes an oil recovery passage, a plurality of first communicating holes, and a first oil suction passage. The oil recovery passage extends in a front and rear direction of a vehicle and is disposed so that at least part of the oil recovery passage is located outward of an external lower end portion of a valve gear chamber of a cylinder head of each of the left and right cylinder banks along a junction between a side wall portion of the cylinder head and a bottom surface of the valve gear chamber in a state where the V-shaped dry sump engine is mounted on the vehicle. The left and right cylinder banks extend in the front and rear direction of the vehicle. The junction is located at a lowermost portion of the cylinder head. The plurality of first communicating holes are provided in the side wall portion so as to connect the valve gear chamber of the cylinder head and the oil recovery passage. The first oil suction passage connects the oil recovery passage and a first oil suction device. Oil in the valve gear chamber of the cylinder head is to be sucked by the first oil suction device into an oil reservoir through the plurality of first communicating holes, the oil recovery passage, and the first oil suction passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
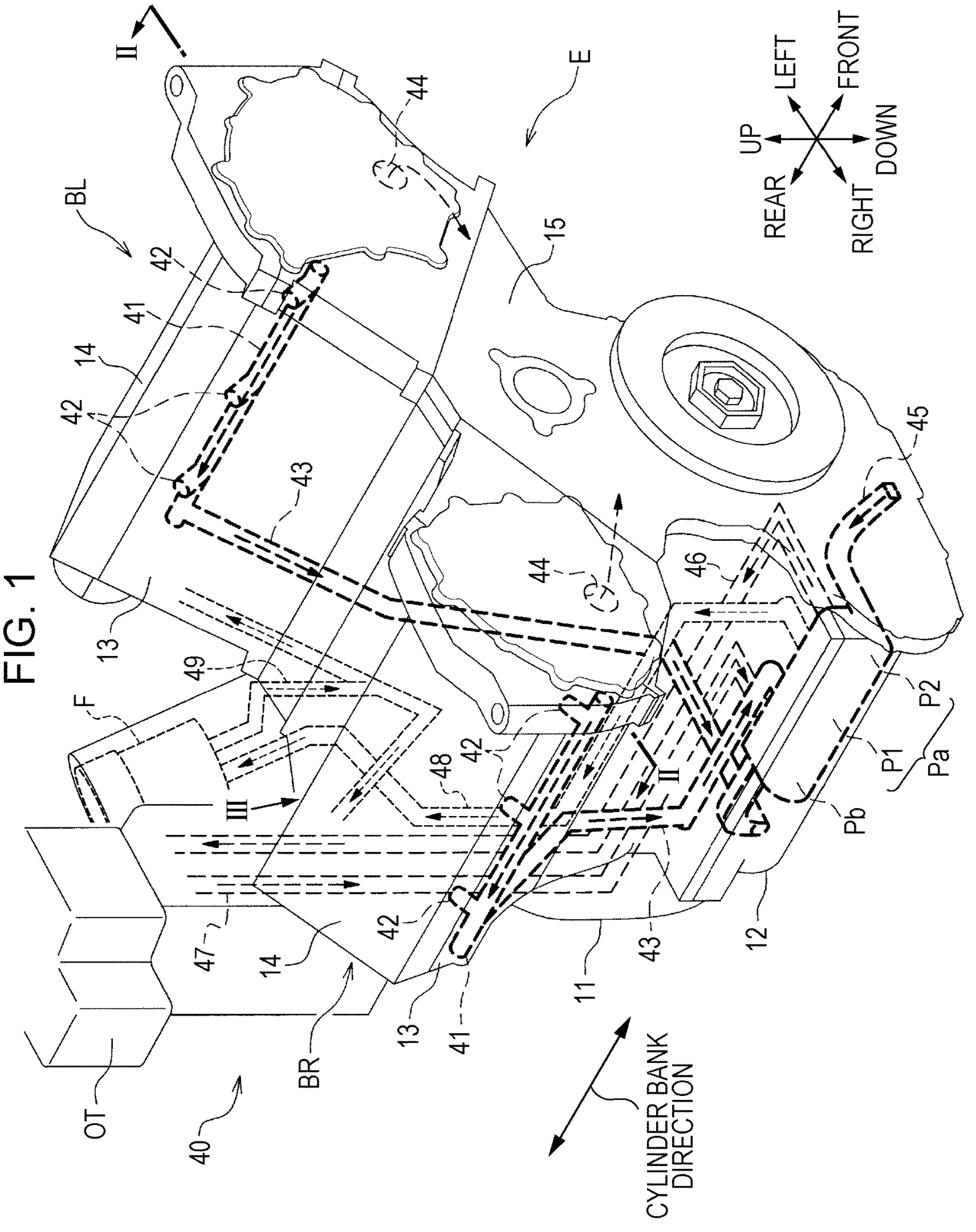
FIG. 1 is a schematic perspective view of an oil passage structure of a V-type dry sump engine according to an embodiment of the disclosure.

The embodiments will now be described with reference to the accompanying drawings, wherein like reference numerals designate corresponding or identical elements throughout the various drawings.

Referring now to the drawings, an embodiment of the disclosure is described in detail. Throughout the description, the same components are denoted by the same reference symbols and are not redundantly described. This embodiment is described by taking as an example the case where an internal-combustion engine according to an embodiment is used as an automobile engine. In the description, directions are described on the basis of the frontward, rearward, upward, downward, leftward, and rightward directions of a vehicle, which are illustrated in FIG. 1.

In this embodiment, the up and down directions coincide with the vertical direction in the state where a V-type dry sump engine is mounted on an automobile. A direction in which cylinder banks extend coincides with the front and rear directions in the state where the V-type dry sump engine is mounted on an automobile. An internal side of each cylinder head is a side that faces the opposite cylinder head and an external side of each cylinder head is a side that faces away from the opposite cylinder head.

Figure 2:
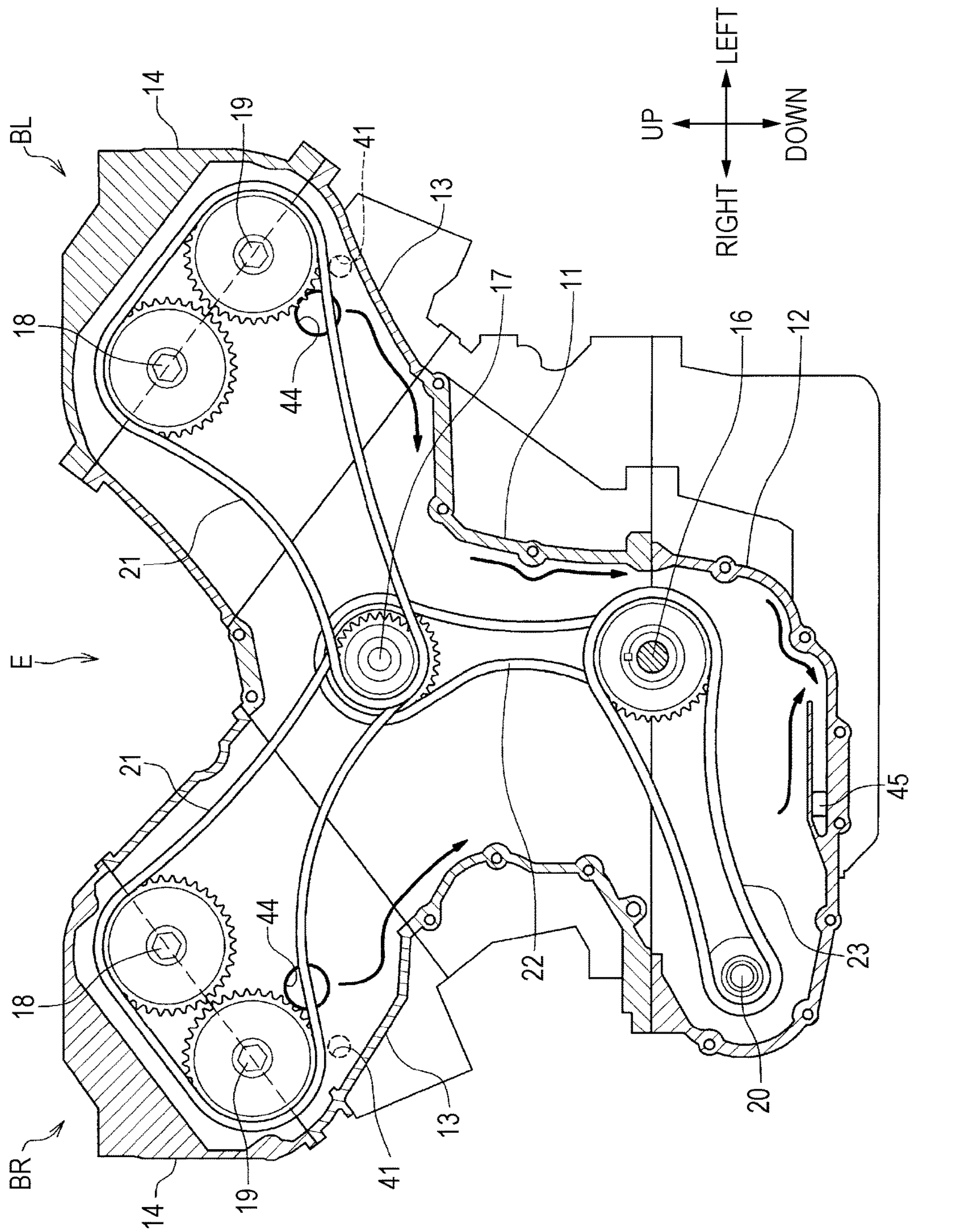
FIG. 2 is a cross-sectional view of the oil passage structure illustrated in FIG. 1 viewed in the direction of arrow II and illustrates an inside of a chain case.
Figure 3:
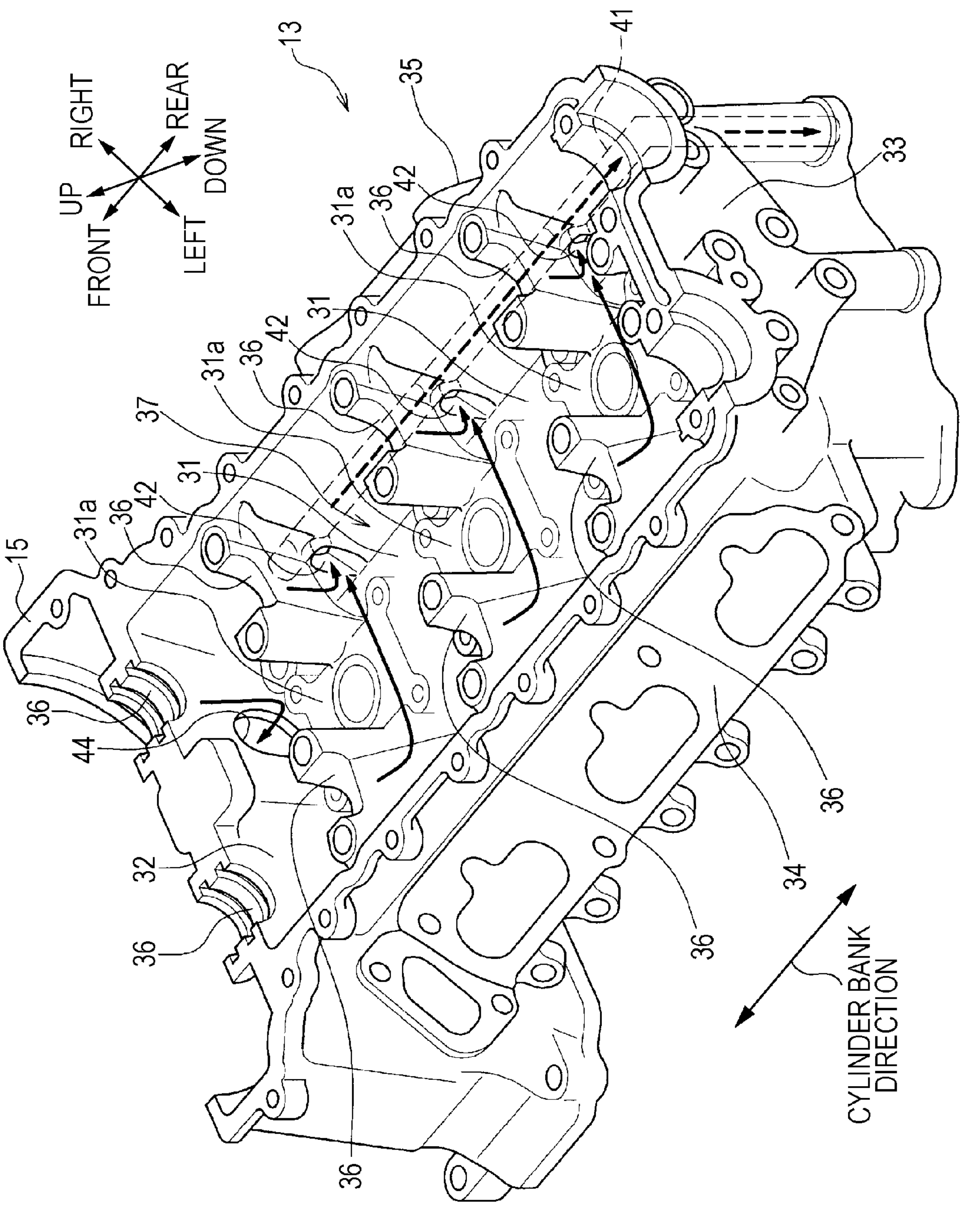
FIG. 3 is a perspective view of a cylinder head viewed in the direction of arrow III in FIG. 1.

Referring to the drawings, FIG. 1 is a schematic perspective view of an oil passage structure 40 of a V-type dry sump engine E according to an embodiment. FIG. 2 is a cross-sectional view of the oil passage structure 40 illustrated in FIG. 1 viewed in the direction of arrow II and illustrates an inside of a chain case. FIG. 3 is a perspective view of a cylinder head viewed in the direction of arrow III in FIG. 1. Here, the cylinder head illustrated in FIG. 3 is a right bank cylinder head. A left bank cylinder head has a shape laterally reversed with respect to the shape of the right cylinder head.

As illustrated in FIG. 1, the V-type dry sump engine E mainly includes a cylinder block 11, a lower block 12, left and right cylinder heads 13, left and right head covers 14, and a chain case 15. Here, the cylinder block 11, the lower block 12, the left and right cylinder heads 13, and the left and right head covers 14 constitute an engine body. The chain case 15 is located at a front end portion of the engine body and includes first end portions of the cylinder block 11, the lower block 12, the cylinder head 13, and the head cover 14 and cover members attached to the first end portions.

Cylinder Block

Although not illustrated, the cylinder block 11 mainly forms a cylinder bore and a crankcase. The cylinder block 11 holds components including a piston, a connecting rod, a crankshaft 16, and a countershaft 17 (see FIG. 2). Both end portions of the countershaft 17 are rotatably supported by the cylinder block 11. A first end portion of the countershaft 17 protrudes beyond the cylinder block 11 to be located inside the chain case 15.

Lower Block

The lower block 12 constitutes a crankcase together with the cylinder block 11 and is disposed under the cylinder block 11. Both end portions of the crankshaft 16 (see FIG. 2) are tightly held between a lower end portion of the cylinder block 11 and an upper end portion of the lower block 12 so that the crankshaft 16 is rotatable. A first end portion of the crankshaft 16 protrudes beyond the cylinder block 11 and the lower block 12 to be located inside the chain case 15. A scavenging pump Pa is disposed inside the lower block 12. A first end portion of a pump driving shaft 20 of the scavenging pump Pa protrudes beyond the lower block 12 to be located inside the chain case 15.

A bottom portion of the lower block 12 serves as a dry sump for oil (lubricating oil) that has flowed down through the engine body.

Cylinder Head

The cylinder heads 13 are disposed over the cylinder block 11. Together with a piston top slidably disposed inside the cylinder of the cylinder block 11, each cylinder head 13 forms a combustion chamber with a recessed space, not illustrated, formed in the bottom surface of the cylinder head 13. Although not illustrated, in each cylinder head 13, an intake port and an exhaust port that are continuous with the recessed space forming the combustion chamber are formed and an intake valve and an exhaust valve for opening and closing the intake port and the exhaust port are disposed. A valve gear chamber is formed in an upper portion of the cylinder head 13 (see FIG. 2). In the valve gear chamber, a valve mechanism such as a rocker arm operable to open and close these valves and an intake cam shaft 18 and an exhaust cam shaft 19 are disposed. The intake cam shaft 18 and the exhaust cam shaft 19 are disposed in such a manner that their axes extend parallel to the cylinder bank direction of the cylinder heads 13. The intake cam shaft 18 and the exhaust cam shaft 19 are driven to rotate by the crankshaft 16.

Head Cover

The head covers 14 are cap-like members that close the top of the cylinder heads 13 to form a valve gear chamber (see FIG. 3). The head covers 14 are disposed over the cylinder heads 13. In this embodiment, first end portions of both end portions of the intake cam shaft 18 and the exhaust cam shaft 19 are rotatably supported between lower cam journals 36, formed in a cam chamber of each cylinder head 13, and upper holders, formed in the corresponding head cover 14 although not illustrated. Second end portions of both end portions of the intake cam shaft 18 and the exhaust cam shaft 19 are rotatably supported between lower cam journals 36, formed in a cam chamber of each cylinder head 13, and upper holders, formed separately from the corresponding head cover 14 although not illustrated. The way in which the cam shafts 18 and 19 are supported is not limited to the above-described method. The first end portions of the cam shafts 18 and 19 are held in the chain case 15. Gears, which are driven members that are driven by and coupled with the crankshaft 16, are attached to the first end portions.

The crankshaft 16 functions as a driving shaft. The countershaft 17, the intake cam shafts 18, the exhaust cam shafts 19, and the pump driving shaft 20 function as driven shafts. The driving force of the crankshaft 16 is transmitted to the cam shafts 18 and 19 through a transmission belt (chain) 22, the countershaft 17, and transmission belts 21 and to the pump driving shaft 20 through a transmission belt 23. Here, each transmission belt 21 is wound around so as to be engaged with gears attached to the countershaft 17 and the cam shafts 18 and 19. The transmission belt 22 is wound around so as to be engaged with gears attached to the crankshaft 16 and the countershaft 17. The transmission belt 23 is wound around so as to be engaged with gears attached to the crankshaft 16 and the pump driving shaft 20.

Cylinder Head

As illustrated in FIG. 3, each cylinder head 13 has an open-top box shape that includes a bottom wall portion 31, a front wall portion 32, a rear wall portion 33, an internal wall portion 34, and an external wall portion 35. The internal wall portion 34 is located on the inner side of the V-shaped banks in the V-type dry sump engine and the external wall portion 35 is located on the outer side of the V-shaped banks in the V-type dry sump engine.

Three plug receiving portions 31*a* are formed in a center portion of the bottom wall portion 31.

The three plug receiving portions 31*a* are arranged at equal intervals in the front-rear directions (cylinder bank direction) in a center portion of the bottom wall portion 31 in the vehicle width direction.

The plug receiving portions 31*a* protrude from the bottom wall portion 31 into the gear valve chamber 37. Each plug receiving portion 31 has a plug receiving hole into which an ignition plug (not illustrated) is inserted.

The bottom wall portion 31 has a surface inclined from the internal wall portion 34 toward the external wall portion 35 in the state where the V-type dry sump engine E is mounted on a vehicle.

Pairs of left and right cam journals 36 are disposed between the plug receiving portions 31*a* and each of the internal wall portion 34 and the external wall portion 35 so as to be arranged in two rows.

An arc-shaped recess is formed in the upper surface of each cam journal 36.

The cam shaft 18 of the pair of the left and right cam shafts 18 and 19 (see FIG. 2), which is located on the inner side of the V-shaped banks, is mounted on the inner three cam journals 36. The cam shaft 19 of the pair of the left and right cam shafts 18 and 19, which is located on the outer side of the V-shaped banks, is mounted on the outer three cam journals 36. Upper cam holders, which are not illustrated, are fastened to the cam journals 36, so that the cam shafts 18 and 19 are rotatably supported.

The junction between the external wall portion 35 and the bottom wall portion 31 of the cylinder head 13 is located at the lowermost portion of the cylinder head 13 in the state where the V-type dry sump engine E is mounted on a vehicle. In the external wall portion 35, an oil recovery passage 41, first communicating holes 42, and a portion of a first oil suction passage 43 are formed, which are described below in detail.

Oil Passage Structure

As illustrated in FIG. 1, the oil passage structure 40 of the V-type dry sump engine includes an oil recovery passage 41, first communicating holes 42, a first oil suction passage 43, a second communicating hole 44, and a second oil suction passage 45, which are provided corresponding to each of the left and right banks BL and BR.

The oil passage structure 40 of the V-type dry sump engine also includes an oil return passage 46, an oil reservoir OT, an oil discharge passage 47, an oil supply passage 48, a filter unit F, and an oil supply passage 49.

The oil passage structure 40 of the V-type dry sump engine also includes a scavenging pump Pa and a feed pump Pb to serve as pumps that generate oil flow.

Oil Recovery Passage

The oil recovery passage 41 is an oil passage formed inside each cylinder head 13.

As illustrated in FIG. 3, the oil recovery passage 41 extends in the direction in which the cylinder bank extends along the junction between the external wall portion 35 and the bottom surface of the valve gear chamber 37 in such a manner that at least part of the oil recovery passage 41 is located outward of an external lower end portion of the valve gear chamber 37. The oil recovery passage 41 is formed by machining a portion of the external wall portion 35 in the direction in which the cylinder bank extends from the rear end surface of the external wall portion 35 up to a portion located between the first and second cam journals 36 from the front end of the cylinder head 13. After the machining, the hole formed in the rear end surface of the external wall portion 35 or in the rear wall portion 33 is closed, so that the rear end of the oil recovery passage 41 is connected with the first oil suction passage 43 to allow the oil to flow therethrough.

The external wall portion 35 at least partially has a thick portion that protrudes outward. Preferably, the oil recovery passage 41 is formed inside the thick portion by machining.

Forming the oil recovery passage 41 inside the valve gear chamber 37 would hamper size reduction of the cylinder head 13 in order that the oil recovery passage 41 is prevented from interfering with other components of the valve mechanism. In this embodiment, on the other hand, at least part of the oil recovery passage 41 is formed outward of the valve gear chamber 37, whereby the oil recovery passage 41 can be formed using a dead space on the outer side of each of the V-type banks BL and BR. Moreover, the passage diameter of the oil recovery passage 41 can be relatively flexibly determined and thus oil can be more effectively recovered.

In this embodiment, the oil recovery passage 41 extends, not throughout the full length of the cylinder head 13 in the direction in which the cylinder bank extends, but up to a portion located between the frontmost (near the chain case 15) and second cam journals 36 of the cylinder head 13. This is because each front wall portion 32 facing the chain case 15 not connected to the oil recovery passage 41 has the second communicating hole 44 that is open to the chain case 15 and through which the oil inside the valve gear chamber 37 is discharged into the chain case 15. Consequently, oil can be preferably recovered even in the case where oil is detained on a side of the oil recovery passage 41 that is not connected to a first oil suction device P1 in the state where the V-type dry sump engine E is inclined when the vehicle turns or drives up or down a slope.

In this structure, the oil that is detained on the side of the valve gear chamber 37 near the chain case 15 is discharged from the second communicating hole 44. Thus, the first oil suction device P1 only needs to suck the oil discharged into the valve gear chamber 37 from a portion located rearward of the portion located between the first and second cam journals 36 from the chain case 15. Thus, the oil recovery passage 41 has a short passage length, whereby the first oil suction device P1 can exert a sufficiently large suction force although retaining a small size. This configuration also can reliably prevent oil from being detained in the valve gear chamber 37 in the state where the V-type dry sump engine E is inclined when the vehicle turns or drives up or down a slope and thus enables preferable lubrication inside the V-type dry sump engine E.

First Communicating Hole

As illustrated in FIG. 3, the first communicating holes 42 are formed by machining the external wall portion 35 from the inner surface of the external wall portion 35 of the cylinder head 13 to the oil recovery passage 41. In other words, the first communicating holes 42 connect the valve gear chamber 37 to the oil recovery passage 41.

In this embodiment, the first communicating holes 42 are individually formed so as to correspond with the cam journals 36. This is for the purpose of more effectively using the suction force of the first oil suction device P1. The number and the open area of the first communicating holes 42 are not limited to those in this embodiment and may be determined appropriately for oil recovery.

In this embodiment, three first communicating holes 42 are formed at lower end portions of the external wall portion 35 facing the valve gear chamber 37, the portions being adjacent to the outer three cam journals 36.

First Oil Suction Passage

As illustrated in FIG. 1, each first oil suction passage 43 is an oil passage formed in the corresponding cylinder head 13, the cylinder block 11, and the lower block 12. A first end portion (upper end portion) of the first oil suction passage 43 is connected to the rear end portion of the oil recovery passage 41 to allow oil to flow therethrough. A second end portion (lower end portion) of the first oil suction passage 43 is connected to the first oil suction device P1 of the scavenging pump Pa to allow oil to flow therethrough.

Second Communicating Hole

Each second communicating hole 44 is a through hole formed in a front wall portion 32 of the corresponding cylinder head 13. In other words, the second communicating hole 44 connects the inside of the valve gear chamber 37 of the cylinder head 13 to the internal space of the chain case 15. Preferably, the second communicating hole 44 is formed at substantially the same level as the bottom wall portion 31 of the cylinder head 13. In this embodiment, the second communicating hole 44 connects a portion near the bottom surface of the valve gear chamber 37 to the internal space of the chain case 15 at or around the external end portion of the valve gear chamber 37.

Second Oil Suction Passage

The second oil suction passage 45 is an oil passage formed in the lower block 12. A first end portion of the second oil suction passage 45 is connected to the internal space of the chain case 15 to allow oil to flow therethrough and a second end portion of the second oil suction passage 45 is connected to a second oil suction device P2 of the scavenging pump Pa to allow oil to flow therethrough. This configuration enables recovery of oil supplied or discharged into the chain case 15.

Scavenging Pump

The scavenging pump Pa is a pump disposed at the bottom of the lower block 12 to suck the oil in the V-type dry sump engine E into the oil reservoir OT. The scavenging pump Pa at least includes a first oil suction device P1 and a second oil suction device P2.

The scavenging pump Pa includes a pump driving shaft 20, to which a rotor of the first oil suction device P1 and a rotor of the second oil suction device P2 are attached.

The first oil suction device P1 is a pump that sucks the oil inside the oil recovery passage 41 of each of the left and right banks BL and BR into the oil reservoir OT. The suction side of the first oil suction device P1 is connected to the first oil suction passages 43 of the left and right banks BL and BR to allow oil to flow therethrough and the discharge side of the first oil suction device P1 is connected to the oil return passage 46 to allow oil to flow therethrough.

The first oil suction device P1 is driven by a single motor to suck the oil inside the oil recovery passages 41 of the left and right banks BL and BR.

The second oil suction device P2 is a pump that sucks the oil inside the chain case 15 into the oil reservoir OT. The suction side of the second oil suction device P2 is connected to the second oil suction passage 45 to allow oil to flow therethrough.

The scavenging pump Pa also includes a rotor for a passage through which oil is recovered from the crank chamber inside the crank case and a rotor for a passage through which oil is recovered from a turbocharger of the V-type dry sump engine E. These rotors are also attached to the pump driving shaft 20. In this embodiment, a feed pump Pb, described below, is integrated with the scavenging pump Pa and a rotor of the feed pump Pb is also attached to the pump driving shaft 20.

Oil Return Passage

The oil return passage 46 is an oil passage formed in the lower block 12 and the cylinder block 11.

A first end portion (lower end portion) of the oil return passage 46 is connected to the scavenging pump Pa to allow oil to flow therethrough and a second end portion (upper end portion) of the oil return passage 46 is connected to the oil reservoir OT to allow oil to flow therethrough.

Oil Reservoir

The oil reservoir OT is a wet sump provided separately from the engine body of the V-type dry sump engine E. The oil reservoir OT holds oil with which components of the V-type dry sump engine E are lubricated.

The oil reservoir OT is connected to the oil return passage 46 and the oil discharge passage 47 to allow oil to flow therethrough.

Oil Discharge Passage

The oil discharge passage 47 is an oil passage formed in the cylinder block 11 and the lower block 12.

A first end portion (upper end portion) of the oil discharge passage 47 is connected to the oil reservoir OT to allow oil to flow therethrough and a second end portion (lower end portion) of the oil discharge passage 47 is connected to the feed pump Pb to allow oil to flow therethrough.

Feed Pump

The feed pump Pb is a pump that feeds the oil inside the oil reservoir OT into the V-type dry sump engine E. The suction side of the feed pump Pb is connected to the oil discharge passage 47 to allow oil to flow therethrough and the discharge side of the feed pump Pb is connected to the oil supply passage 48 to allow oil to flow therethrough.

Oil Supply Passage

The oil supply passage 48 is an oil passage formed in the lower block 12 and the cylinder block 11. A first end portion (lower end portion) of the oil supply passage 48 is connected to the feed pump Pb to allow oil to flow therethrough and a second end portion (upper end portion) of the oil supply passage 48 is connected to a filter unit F to allow oil to flow therethrough.

The filter unit F is disposed between an upstream portion of the oil supply passage 48 and a downstream portion of the oil supply passage 49. The filter unit F has functions such as a function of filtering oil that flows therethrough and a function of gas-liquid separation. The filter unit F is disposed between the banks BL and BR.

Oil Supply Passage

The oil supply passage 49 is an oil passage formed in the cylinder block 11 and the cylinder head 13. A first end portion of the oil supply passage 49 is connected to the filter unit F to allow oil to flow therethrough and a second end portion of the oil supply passage 49 is connected to an oil passage formed in the cam shafts 18 and 19 and a rocker arm (not illustrated), which are components in the cylinder head 13 that require lubrication, to allow oil to flow therethrough. The oil passage formed in the cam shafts 18 and 19 has discharge holes near the cam journals 36 and the oil discharged from the discharge holes is used to lubricate the cam journals 36.

Other oil supply passages (not illustrated) are also formed in the engine body to feed oil to components that require lubrication such as the crankshaft 16, a piston, and a chain tensioner, which are disposed outside the cylinder head 13, and these oil supply passages are connected to the filter unit F to allow oil to flow therethrough. The oil in the oil reservoir OT is also fed by the feed pump Pb through these oil supply passages to these components that require lubrication and that are disposed outside the cylinder head 13.

Oil Flow in Oil Passage Structure

Subsequently, an oil flow in the oil passage structure 40 of the V-type dry sump engine is described.

Firstly, oil held in the oil reservoir OT is discharged by the feed pump Pb through the oil discharge passage 47. The discharged oil is fed to the cylinder heads 13 of the left and right banks BL and BR through the oil supply passage 48, the filter unit F, and the oil supply passage 49.

The oil fed to the cylinder heads 13 flows through, for example, oil passages inside the intake cam shaft 18 and the exhaust cam shaft 19 and is then discharged out of the cam shafts 18 and 19 through discharge holes (not illustrated) of the cam shafts 18 and 19. These discharge holes are formed near the cam journals 36 in each valve gear chamber 37. The oil discharged out of the cam shafts 18 and 19 flows down to the bottom wall portion 31 of the valve gear chamber 37 after being used to lubricate the cam journals 36 and flows toward the external wall portion 35 along the inclination of the banks Ba and Bb.

The oil that arrives at the external wall portion 35 is sucked by the first oil suction device P1 and then flows into the oil recovery passage 41 through the first communicating holes 42. The oil that has flowed into the oil recovery passage 41 is sucked by the first oil suction device P1 through the first oil suction passage 43 and returned to the oil reservoir OT through the oil return passage 46.

Part of oil inside each cylinder head 13 is discharged into the chain case 15 through the second communicating hole 44. The oil discharged into the chain case 15 flows down inside the chain case 15.

The oil that has flowed down inside the chain case 15 and has been detained in a bottom portion of the chain case 15 is sucked by the second oil suction device P2 through the second oil suction passage 45 and then returned to the oil reservoir OT through the oil return passage 46.

Part of the oil fed to each cylinder head 13 flows down to the crank chamber below the cylinder head 13. The oil that has flowed down to the crank chamber or the oil that has been fed to the crank chamber through an oil supply passage, not illustrated, is sucked by another rotor of the scavenging pump Pa and returned to the oil reservoir OT through the oil return passage 46.

In the oil passage structure 40 of the V-type dry sump engine E according to the above-described embodiment, the oil recovery passages 41 are formed on the outer side of the side walls of the cylinder head 13 so as to be separated from the valve gear chamber 37 of the cylinder head 13 and connected with the valve gear chamber 37 only through the first communicating holes 42. Thus, the suction force of the first oil suction device P1 can be efficiently used to recover oil detained in the oil recovery passage 41. In addition, the suction force of the first oil suction device P1 can be concentrated on the first communicating holes 42, so that the oil in the valve gear chamber 37 can be sucked into the oil recovery passage 41 for recovery.

Even in the case where the first oil suction device P1 fails to suck oil sufficiently well in the state where the V-type dry sump engine E is inclined when, for example, the vehicle turns quickly or drives up or down a slope, the oil passage structure 40 of the V-type dry sump engine E can discharge the oil in the valve gear chamber 37 of the cylinder head 13 into the chain case 15 through the second communicating hole 44 and cause the second oil suction device P2 connected to the chain case 15 to recover the oil into the oil reservoir OT. Thus, even a small amount of oil can be efficiently fed to each component to be used to fully lubricate the component regardless of the driving condition of the vehicle.

In the oil passage structure 40 of the V-type dry sump engine E, a large amount of oil fed to portions around the cam journals 36 is discharged into the valve gear chamber 37 from the portions around the cam journals 36. The first oil suction device P1 sucks the oil inside the valve gear chamber 37 into the oil recovery passage 41 through the first communicating holes 42 formed adjacent to the cam journals 36 with a relatively strong suction force. Thus, oil can be prevented from being detained inside the valve gear chamber 37 and rapidly and efficiently recovered.

In the oil passage structure 40 of the V-type dry sump engine E, the first oil suction device P1 can suck oil inside the valve gear chambers 37 of both cylinder heads 13 of the left and right banks BL and BR. This structure requires fewer components and thus enables weight loss of the product. In addition, the oil passage structure can be simplified and can be more easily formed.

In the oil passage structure 40 of the V-type dry sump engine E, oil (lubricating oil) can be rapidly recovered into the oil reservoir OT from the inside of the valve gear chamber 37 of each cylinder head 13 holding the valve mechanism, which includes a large number of components and requires a large amount of oil, without being detained in the valve gear chamber 37 and then immediately fed to the components requiring lubrication. Thus, the oil passage structure 40 enables the components to be fully lubricated with a small amount of oil and also enables size reduction of the oil suction devices P1 and P2.

In addition, in the oil passage structure 40 of the V-type dry sump engine E, a single oil suction device P1 can recover oil from both banks BL and BR of the V-type dry sump engine E. Thus, the oil passage structure 40 requires fewer components. In addition, sharing the passages of oil from both banks BL and BR enables size reduction and facilitation of production process of the engine body.

An embodiment of the disclosure has been described thus far but the present disclosure is not limited to this embodiment and may be appropriately changed within the scope not departing from the gist of the disclosure. For example, a V-type dry sump engine E may be mounted on a vehicle while being oriented in the opposite direction to the direction in which the V-type dry sump engine E illustrated in the drawings is oriented with respect to the front and rear directions. The oil passage structure of a dry sump engine according to the disclosure is also usable in dry sump engines that are not V-type dry sump engines and that are mounted on a vehicle (vehicle body) in an inclined manner. In this case, the dry sump engines only have to include at least one first communicating hole. In other words, the oil passage structure of a dry sump engine according to the present disclosure is usable in a dry sump engine that is mounted on a vehicle in such a manner that at least a cylinder head is inclined and that has a valve gear chamber having an inclined bottom surface.

An aspect of the present disclosure provides an oil passage structure of a dry sump engine mounted on a vehicle in an inclined manner. The oil passage structure includes an oil recovery passage that extends in a direction in which a cylinder bank extends and is disposed so that at least part of the oil recovery passage is located outward of an external lower end portion of a valve gear chamber of a cylinder head along a junction between a side wall portion of the cylinder head and a bottom surface of the valve gear chamber in a state where the dry sump engine is mounted on the vehicle in the inclined manner, the junction being located at a lowermost portion of the cylinder head; at least one first communicating hole formed in the side wall portion so as to connect the valve gear chamber of the cylinder head and the oil recovery passage together; and a first oil suction passage that connects the oil recovery passage and a first oil suction device together. In the oil passage structure, oil in the valve gear chamber of the cylinder head is sucked by the first oil suction device into an oil reservoir through the at least one first communicating hole, the oil recovery passage, and the first oil suction passage.

Another aspect of the present disclosure provides an oil passage structure of a V-type dry sump engine including left and right cylinder banks extending in front and rear directions of a vehicle. The oil passage structure includes an oil recovery passage that extends in the front and rear direction of the vehicle and is disposed so that at least part of the oil recovery passage is located outward of an external lower end portion of a valve gear chamber of a cylinder head of each of the left and right banks along a junction between a side wall portion of the cylinder head and a bottom surface of the valve gear chamber in a state where the V-type dry sump engine is mounted on the vehicle, the junction being located at a lowermost portion of the cylinder head; multiple first communicating holes formed in the side wall portion so as to connect the valve gear chamber of the cylinder head and the oil recovery passage together; and a first oil suction passage that connects the oil recovery passage and a first oil suction device together. In the oil passage structure, oil in the valve gear chamber of the cylinder head is sucked by the first oil suction device into an oil reservoir through the multiple first communicating holes, the oil recovery passage, and the first oil suction passage.

In this structure, at least part of the oil recovery passage is formed outward of the side wall portion of the cylinder head, separated from the valve gear chamber of the cylinder head, and connected to the valve gear chamber only through the first communicating hole or holes. Thus, the suction force of the first oil suction device can be efficiently used to recover oil detained in the oil recovery passage. In addition, the suction force of the first oil suction device can be concentrated on the first communicating hole or holes, so that the oil in the valve gear chamber can be sucked into the oil recovery passage for recovery.

In the oil passage structure of a dry sump engine and the oil passage structure of a V-type dry sump engine, the first oil suction passage may be connected to a first end portion of the oil recovery passage in the front and rear direction of the vehicle. The oil passage structure may further include a second communicating hole that is formed in a wall portion of the cylinder head, serving as a second end portion of the cylinder head in the front and rear direction of the vehicle, and that connects the valve gear chamber and a chain case together and a second oil suction passage that connects an inside of the chain case and a second oil suction device together. Oil discharged from the valve gear chamber of the cylinder head into the chain case through the second communicating hole may be sucked by the second oil suction device into the oil reservoir through the second oil suction passage.

Even in the case where the first oil suction device fails to suck oil sufficiently well in the state where the dry sump engine or the V-type dry sump engine is inclined when, for example, the vehicle turns quickly or drives up or down a slope, the oil passage structure can discharge the oil in the valve gear chamber of the cylinder head into the chain case through the second communicating hole and cause the second oil suction device connected to the chain case to recover the oil into the oil reservoir. Thus, even a small amount of oil can be efficiently fed to each component to be used to fully lubricate the component regardless of the driving condition of the vehicle.

In the oil passage structure of a V-type dry sump engine, the first communicating holes may be formed so as to be adjacent to multiple cam journals.

In this structure, a relatively large amount of oil fed to portions around the cam journals is discharged into the valve gear chamber from the portions around the cam journals. The first oil suction device sucks the oil inside the valve gear chamber into the oil recovery passage through the first communicating holes formed adjacent to the cam journals with a relatively strong suction force to prevent the oil from being detained inside the valve gear chamber and to rapidly and efficiently recover oil.

In the oil passage structure of a V-type dry sump engine, the first oil suction device may be common to the cylinder heads of the left and right banks.

In the oil passage structure, oil inside the valve gear chamber of the cylinder heads of the left and right banks can be sucked by the common first oil suction device. This structure requires fewer components and thus enables weight loss of the product. In addition, the oil passage structure can be simplified and can be more easily formed.

In the structure according to this disclosure, oil inside the valve gear chamber of the cylinder head holding the valve mechanism, includes a large number of components and requires a relatively large amount of oil (lubricating oil), can be rapidly recovered into the oil reservoir without being detained in the valve gear chamber and immediately fed to the components requiring lubrication. Thus, the oil passage structure requires less oil to fully lubricate the components and also enables size reduction of the oil suction devices.

In the structure according to this disclosure, a single oil suction device can recover oil from both banks of the V-type engine. Thus, the oil passage structure requires fewer components. In addition, sharing the passages of oil from both banks enables size reduction and facilitation of the production process of the engine body.

Obviously, numerous modifications and variations of the present invention are possible in light of the above teachings. It is therefore to be understood that within the scope of the appended claims, the invention may be practiced otherwise than as specifically described herein.

What is claimed is:

1. An oil passage structure of a dry sump engine mounted on a vehicle in an inclined manner, comprising:

an oil recovery passage that extends in a direction in which a cylinder bank extends and is disposed so that at least part of the oil recovery passage is located outward of an external lower end portion of a valve gear chamber of a cylinder head along a junction between a side wall portion of the cylinder head and a bottom surface of the valve gear chamber in a state where the dry sump engine is mounted on the vehicle in the inclined manner, the junction being located at a lowermost portion of the cylinder head;

at least one first communicating hole formed in the side wall portion so as to connect the valve gear chamber of the cylinder head and the oil recovery passage together; and a first oil suction passage that connects the oil recovery passage and a first oil suction device together, wherein oil in the valve gear chamber of the cylinder head is sucked by the first oil suction device into an oil reservoir through the at least one first communicating hole, the oil recovery passage, and the first oil suction passage such that oil exits the valve gear chamber by first passing through the at least one first communicating hole, subsequently entering the oil recovery passage, and then entering the first oil suction passage before exiting the cylinder head.

2. The oil passage structure according to claim 1, wherein the first oil suction passage is connected to a first end portion of the oil recovery passage in the direction in which the cylinder bank extends, wherein the oil passage structure further comprises:

a second communicating hole that is formed in a wall portion of the cylinder head, serving as a second end portion of the cylinder head in the direction in which the cylinder bank extends, and that connects the valve gear chamber and a chain case together; and a second oil suction passage that connects an inside of the chain case and a second oil suction device together, and wherein oil discharged from the valve gear chamber of the cylinder head into the chain case through the second communicating hole is sucked by the second oil suction device into the oil reservoir through the second oil suction passage.

3. An oil passage structure of a V-shaped dry sump engine including left and right cylinder banks extending in front and rear directions of a vehicle, comprising:

an oil recovery passage that extends in the front and rear direction of the vehicle and is disposed so that at least part of the oil recovery passage is located outward of an external lower end portion of a valve gear chamber of a cylinder head of each of the left and right cylinder banks along a junction between a side wall portion of the cylinder head and a bottom surface of the valve gear chamber in a state where the V-shaped dry sump engine is mounted on the vehicle, the junction being located at a lowermost portion of the cylinder head;

a plurality of first communicating holes formed in the side wall portion so as to connect the valve gear chamber of the cylinder head and the oil recovery passage together; and a first oil suction passage that connects the oil recovery passage and a first oil suction device together, wherein oil in the valve gear chamber of the cylinder head is sucked by the first oil suction device into an oil reservoir through the plurality of first communicating holes, the oil recovery passage, and the first oil suction passage such that oil exits the valve gear chamber of each of the left and right cylinder banks by first passing through one of the plurality of first communicating holes, subsequently entering the oil recovery passage, and then entering the first oil suction passage before exiting the cylinder head.

4. The oil passage structure according to claim 3, wherein the first oil suction passage is connected to a first end portion of the oil recovery passage in the front and rear direction of the vehicle, wherein the oil passage structure further comprises:

a second communicating hole that is formed in a wall portion of the cylinder head, serving as a second end portion of the cylinder head in the front and rear direction of the vehicle, and that connects the valve gear chamber and a chain case together; and a second oil suction passage that connects an inside of the chain case and a second oil suction device together, and wherein oil discharged from the valve gear chamber of the cylinder head into the chain case through the second communicating hole is sucked by the second oil suction device into the oil reservoir through the second oil suction passage.

5. The oil passage structure according to claim 3, wherein the plurality of first communicating holes are formed so as to be adjacent to a plurality of cam journals.

6. The oil passage structure according to claim 3, wherein the first oil suction device is common to the cylinder heads of the left and right cylinder banks.

7. An oil passage structure of a dry sump engine, comprising:

an oil recovery passage extending in a direction in which a cylinder bank extends and disposed so that at least part of the oil recovery passage is located outward of an external lower end portion of a valve gear chamber of a cylinder head along a junction between a side wall portion of the cylinder head and a bottom surface of the valve gear chamber in a state where the dry sump engine is mounted on a vehicle in an inclined manner, the junction being located at a lowermost portion of the cylinder head;

at least one first communicating hole provided in the side wall portion so as to connect the valve gear chamber of the cylinder head and the oil recovery passage; and a first oil suction passage connecting the oil recovery passage and a first oil suction device, oil in the valve gear chamber of the cylinder head being to be sucked by the first oil suction device into an oil reservoir through the at least one first communicating hole, the oil recovery passage, and the first oil suction passage such that oil exits the valve gear chamber by first passing through the at least one first communicating hole, subsequently entering the oil recovery passage, and then entering the first oil suction passage before exiting the cylinder head.

8. The oil passage structure according to claim 7, wherein the first oil suction passage is connected to a first end portion of the oil recovery passage in the direction in which the cylinder bank extends, wherein the oil passage structure further comprises:

a second communicating hole that is provided in a wall portion of the cylinder head, serving as a second end portion of the cylinder head in the direction in which the cylinder bank extends, and that connects the valve gear chamber and a chain case; and a second oil suction passage that connects an inside of the chain case and a second oil suction device, and wherein oil discharged from the valve gear chamber of the cylinder head into the chain case through the second communicating hole is sucked by the second oil suction device into the oil reservoir through the second oil suction passage.

9. An oil passage structure of a V-shaped dry sump engine including left and right cylinder banks, comprising:

an oil recovery passage extending in a front and rear direction of a vehicle and disposed so that at least part of the oil recovery passage is located outward of an external lower end portion of a valve gear chamber of a cylinder head of each of the left and right cylinder banks along a junction between a side wall portion of the cylinder head and a bottom surface of the valve gear chamber in a state where the V-shaped dry sump engine is mounted on the vehicle, the left and right cylinder banks extending in the front and rear direction of the vehicle, the junction being located at a lowermost portion of the cylinder head;

a plurality of first communicating holes provided in the side wall portion so as to connect the valve gear chamber of the cylinder head and the oil recovery passage; and a first oil suction passage connecting the oil recovery passage and a first oil suction device, oil in the valve gear chamber of the cylinder head being to be sucked by the first oil suction device into an oil reservoir through the plurality of first communicating holes, the oil recovery passage, and the first oil suction passage such that oil exits the valve gear chamber of each of the left and right cylinder banks by first passing through one of the plurality of first communicating holes, subsequently entering the oil recovery passage, and then entering the first oil suction passage before exiting the cylinder head.

10. The oil passage structure according to claim 9, wherein the first oil suction passage is connected to a first end portion of the oil recovery passage in the front and rear direction of the vehicle, wherein the oil passage structure further comprises:

a second communicating hole that is provided in a wall portion of the cylinder head, serving as a second end portion of the cylinder head in the front and rear direction of the vehicle, and that connects the valve gear chamber and a chain case; and a second oil suction passage that connects an inside of the chain case and a second oil suction device, and wherein oil discharged from the valve gear chamber of the cylinder head into the chain case through the second communicating hole is sucked by the second oil suction device into the oil reservoir through the second oil suction passage.

11. The oil passage structure according to claim 9, wherein the plurality of first communicating holes are provided so as to be adjacent to a plurality of cam journals.

12. The oil passage structure according to claim 9, wherein the first oil suction device is common to the cylinder heads of the left and right cylinder banks.

13. The oil passage structure according to claim 7, wherein the oil recovery passage is provided entirely inside the side wall portion of the cylinder head.

14. The oil passage structure according to claim 1, wherein at least one cam journal is provided in the cylinder head, the at least one cam journal being connected to the side wall portion of the cylinder head and the bottom surface of the valve gear chamber, the side wall portion of the cylinder head and the bottom surface of the valve gear chamber being located at the lowermost portion of the cylinder head, wherein the at least one first communicating hole is formed adjacent to the at least one cam journal, wherein the at least one first communicating hole is provided between the wall portion of the cylinder head and the at least one cam journal adjacent to the wall portion, wherein the at least one cam journal includes a plurality of cam journals, the plurality of cam journals being arranged in the direction in which the cylinder bank extends, the plurality of cam journals including a pair of cam journals disposed adjacent to each other, and wherein the at least one first communicating hole is provided between the pair of cam journals.

15. The oil passage structure according to claim 1, wherein the oil recovery passage is provided entirely inside the side wall portion of the cylinder head.

16. The oil passage structure according to claim 3, wherein the oil recovery passage is provided entirely inside the side wall portion of the cylinder head.

17. The oil passage structure according to claim 7, wherein at least one cam journal is provided in the cylinder head, the at least one cam journal being connected to the side wall portion of the cylinder head and the bottom surface of the valve gear chamber, the side wall portion of the cylinder head and the bottom surface of the valve gear chamber being located at the lowermost portion of the cylinder head, wherein the at least one first communicating hole is formed adjacent to the at least one cam journal, wherein the at least one first communicating hole is provided between the wall portion of the cylinder head and the at least one cam journal adjacent to the wall portion, wherein the at least one cam journal includes a plurality of cam journals, the plurality of cam journals being arranged in the direction in which the cylinder bank extends, the plurality of cam journals including a pair of cam journals disposed adjacent to each other, and wherein the at least one first communicating hole is provided between the pair of cam journals.

18. The oil passage structure according to claim 9, wherein the oil recovery passage is provided entirely inside the side wall portion of the cylinder head.

* * * * *